(12) United States Patent
Benhase et al.

(10) Patent No.: US 9,195,598 B2
(45) Date of Patent: *Nov. 24, 2015

(54) SYNCHRONOUS AND ASYNCHRONOUS DISCARD SCANS BASED ON THE TYPE OF CACHE MEMORY

(75) Inventors: Michael T. Benhase, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 153 days.

This patent is subject to a terminal disclaimer.

(21) Appl. No.: 13/491,795

(22) Filed: Jun. 8, 2012

(65) Prior Publication Data

US 2013/0332645 A1 Dec. 12, 2013

(51) Int. Cl.
*G06F 12/08* (2006.01)

(52) U.S. Cl.
CPC ........ *G06F 12/0806* (2013.01); *G06F 12/0895* (2013.01)

(58) Field of Classification Search
CPC ...................................................... G06F 12/08
USPC ............................ 711/103, 162, 166, 170, 202
See application file for complete search history.

(56) References Cited

U.S. PATENT DOCUMENTS

| | | | |
|---|---|---|---|
| 4,875,155 A | 10/1989 | Iskiyan et al. | |
| 7,191,207 B2 | 3/2007 | Blount | |
| 7,769,802 B2 * | 8/2010 | Smith et al. | 709/201 |
| 8,549,222 B1 | 10/2013 | Kleiman et al. | |
| 8,621,145 B1 | 12/2013 | Kimmel et al. | |
| 2004/0117441 A1 | 6/2004 | Liu et al. | |
| 2004/0260882 A1 | 12/2004 | Martinez et al. | |
| 2006/0069888 A1 | 3/2006 | Martinez | |
| 2006/0294301 A1 | 12/2006 | Zohar et al. | |
| 2009/0222621 A1 | 9/2009 | Ash et al. | |
| 2009/0249015 A1 | 10/2009 | Tzeng | |
| 2010/0037226 A1 | 2/2010 | Benhase et al. | |
| 2010/0257321 A1 | 10/2010 | Gupta | |
| 2012/0198174 A1 | 8/2012 | Nellans et al. | |
| 2012/0239853 A1 | 9/2012 | Moshayedi | |
| 2012/0324173 A1 | 12/2012 | Benhase et al. | |
| 2013/0042156 A1 | 2/2013 | Srinivasan et al. | |
| 2013/0138884 A1 * | 5/2013 | Kawamura | 711/119 |
| 2013/0262746 A1 * | 10/2013 | Srinivasan | 711/103 |
| 2013/0318283 A1 | 11/2013 | Small et al. | |

(Continued)

FOREIGN PATENT DOCUMENTS

EP 1030243 * 2/1999 ............. G06F 12/08

OTHER PUBLICATIONS

Batsakis et al. (AWOL: An Adaptive Write Optimizations Layer, FAST '08: 6th USENIX Conference on File and Storage Technologies, 2008).*

(Continued)

*Primary Examiner* — Aimee Li
*Assistant Examiner* — Tracy Chan
(74) *Attorney, Agent, or Firm* — Rabindranath Dutta; Konrad Raynes Davda & Victor LLP

(57) ABSTRACT

A computational device maintains a first type of cache and a second type of cache. The computational device receives a command from the host to release space. The computational device synchronously discards tracks from the first type of cache, and asynchronously discards tracks from the second type of cache.

4 Claims, 7 Drawing Sheets

(56) References Cited

U.S. PATENT DOCUMENTS

| | | |
|---|---|---|
| 2014/0068163 A1 | 3/2014 | Benhase et al. |
| 2014/0068189 A1 | 3/2014 | Benhase et al. |
| 2014/0068191 A1 | 3/2014 | Benhase et al. |

OTHER PUBLICATIONS

Batsakis et al. (AWOL: An Adaptive Write Optimizations Layer, FAST '08: 6th USENIX Conference on File and Storage Technologies, 2008; hereinafter referred as Batsakis).*

G. Smith, "The Linux Page Cache and pdflush: Theory of Operation and Tuning for Write-Heavy Loads", 2007, pp. 2 [online] http://www.westnet.com/gsmith/content/linux-pdflush.htm.

C.K. Shene, "Multithreaded Programming and ThreadMentor: A Tutorial", Department of Computer Science, Michigan Technological Univeristy, Mar. 2011, pp. 2.

Preliminary Amendment dated Nov. 6, 2013, pp. 4, for U.S. Appl. No. 14/073,612, filed Nov. 6, 2013.

U.S. Appl. No. 14/073,612, filed Nov. 6, 2013.

Office Action dated Mar. 14, 2014, pp. 17, for U.S. Appl. No. 13/569,951, filed Aug. 8, 2012.

Preliminary Remarks dated Nov. 6, 2013, pp. 2, for U.S. Appl. No. 14/073,545, filed 20103-11-112.

Preliminary Remarks dated Nov. 6, 2013, pp. 2, for U.S. Appl. No. 14/073,551, filed Nov. 6, 2013.

Preliminary Remarks dated Nov. 6, 2013, pp. 2, for U.S. Appl. No. 14/073,570, filed Nov. 6, 2013.

Office Action dated Mar. 20, 2014, pp. 15, for U.S. Appl. No. 14/073,570, filed Nov. 6, 2013.

U.S. Appl. No. 13/569,951, filed Aug. 8, 2012 by inventors M. Benhase et al.

U.S. Appl. No. 13/747,351, filed Jan. 22, 2013 by inventors M. Benhase, et al.

Performing Asynchronous Discard Scans With Staging and Destaging Operations, by inventors M. Benhase, L.Gupta, and Matthew J. Kalos.

Office Action dated May 16, 2014, pp. 21, for U.S. Appl. No. 14/073,545, filed Nov. 6, 2013.

Office Action dated May 8, 2014, pp. 28, for U.S. Appl. No. 13/491,818, filed Jun. 8, 2012.

Office Action dated May 8, 2014, pp. 22, for U.S. Appl. No. 14/073,551, filed Nov. 6, 2013.

Response dated Jun. 16, 2014, pp. 19, to Office Action dated Mar. 14, 2014, pp. 17, for U.S. Appl. No. 13/569,951, filed Aug. 8, 2012.

Response dated Jun. 20, 2014, pp. 17, to Office Action dated Mar. 20, 2014 pp. 15, for U.S. Appl. No. 14/073,570, filed Nov. 6, 2013.

Response dated Aug. 18, 2014, pp. 7, to Office Action dated May 16, 2014, pp. 21, for U.S. Appl. No. 14/073,545, filed Nov. 6, 2013.

Response dated Aug. 8, 2014, pp. 22, to Office Action dated May 8, 2014 pp. 28, for U.S. Appl. No. 13/491,818, filed Jun. 8, 2012.

Response dated Aug. 8, 2014, pp. 18, to Office Action dated May 8, 2014, pp. 22, for U.S. Appl. No. 14/073,551, filed Nov. 6, 2013.

Office Action dated Aug. 28, 2014, pp. 15, for U.S. Appl. No. 13/747,351, filed Jan. 22, 2013.

Notice of Allowance dated Sep. 9, 2014, pp. 27, for U.S. Appl. No. 13/569,951, filed Aug. 8, 2012.

Office Action dated Aug. 29, 2014, pp. 29, for U.S. Appl. No. 14/073,612, filed Nov. 6, 2013.

Notice of Allowance dated Sep. 9, 2014, pp. 24, for U.S. Appl. No. 14/073,570, filed Nov. 6, 2013.

Final Office Action dated Feb. 23, 2015, pp. 024, for U.S. Appl. No. 13/747,351, filed Jan. 22, 2013.

Final Office Action dated Feb. 12, 2015, pp. 24, for U.S. Appl. No. 14/073,612, filed Nov. 6, 2013.

Response dated Feb. 9, 2015, pp. 9, to Final Office Action dated Nov. 7, 2014, pp. 16, for U.S. Appl. No. 14/073,551, filed Nov. 6, 2013.

Response dated Feb. 5, 2015, pp. 6, to Final Office Action Nov. 6, 2014, pp. 17, for U.S. Appl. No. 14/073,545, filed Nov. 6, 2013.

Response dated Feb. 5, 2015, pp. 13, to Final Office Action dated Nov. 6, 2014, pp. 21, for U.S. Appl. No. 13/491,818, filed Jun. 8, 2012.

Final Office Action dated Nov. 6, 2014, pp. 21, for U.S. Appl. No. 13/491,818, filed Jun. 8, 2012.

Final Office Action dated Nov. 7, 2014, pp. 16, for U.S. Appl. No. 14/073,551, filed Nov. 6, 2013.

Response filed Nov. 28, 2014, pp. 8, to Office Action dated Aug. 28, 2014, pp. 15, for U.S. Appl. No. 13/747,351, filed Jan. 22, 2013.

Response filed Dec. 1, 2014, pp. 6, to Office Action dated Aug. 29, 2014, pp. 29, for U.S. Appl. No. 14/073,612, filed Nov. 6, 2013.

U.S. Appl. No. 14/588,833, filed Jan. 2, 2015.

Final Office Action Nov. 6, 2014, pp. 17, for U.S. Appl. No. 14/073,545, filed Nov. 6, 2013.

Notice of Allowance dated Jan. 20, 2015, pp. 15, for U.S. Appl. No. 14/073,570, filed Nov. 6, 2013.

Notice of Allowance dated Jan. 22, 2015, pp. 14, for U.S. Appl. No. 13/569,951, filed Aug. 8, 2012.

Notice of Allowance dated May 20, 2015, pp. 33, for U.S. Appl. No. 14/073,545, filed Nov. 6, 2013.

Office Action dated May 21, 2015, pp. 29, for U.S. Appl. No. 13/491,818, filed Jun. 8, 2012.

Office Action dated May 19, 2015, pp. 22, for U.S. Appl. No. 14/073,551, filed Nov. 6, 2013.

Response filed May 21, 2015, pp. 8, to Final Office Action dated Feb. 23, 2015, pp. 024, for U.S. Appl. No. 13/747,351, filed Jan. 22, 2013.

Response filed May 12, 2015, pp. 6, to Final Office Action dated Feb. 12, 2015, pp. 24, for U.S. Appl. No. 14/073,612, filed Nov. 6, 2013.

Notice of Allowance dated May 19, 2015, pp. 18, for U.S. Appl. No. 14/073,612, filed Nov. 6, 2013.

Notice of Allowance dated 2015-06-18-20, pp. 11, for U.S. Appl. No. 14/073,545, filed Nov. 6, 2013.

Notice of Allowance dated Jun. 10, 2015, pp. 18, for U.S. Appl. No. 13/747,351, filed Jan. 22, 2013.

Office Action dated Jun. 19, 2015, pp. 39, for U.S. Appl. No. 14/588,833, filed Jan. 2, 2015.

Notice of Allowance dated Jun. 22, 2015, pp. 13, for U.S. Appl. No. 14/073,612, filed Nov. 6, 2013.

Notice of Allowance dated Jul. 30, 2015, pp. 15, for U.S. Appl. No. 13/569,951, filed Aug. 8, 2012.

Response dated Aug. 19, 2015, pp. 10, to Office Action dated May 19, 2015, pp. 22, for U.S. Appl. No. 14/073,551, filed Nov. 6, 2013.

Notice of Allowance dated Sep. 1, 2015, pp. 13, for U.S. Appl. No. 14/073,551, filed Nov. 6, 2013.

Response dated Aug. 21, 2015, pp. 14, to Office Action dated May 21, 2015, pp. 29, for U.S. Appl. No. 13/491,818, filed Jun. 8, 2012.

Notice of Allowance dated Sep. 17, 2015 for U.S. Appl. No. 13/491,818, filed Jun. 8, 2012.

U.S. Appl. No. 14/852,123, filed Sep. 11, 2015.

U.S. Appl. No. 14/849,415, filed Sep. 9, 2013.

Response dated Sep. 21, 2015, pp. 13, to Office Action dated Jun. 19, 2015, pp. 39, for U.S. Appl. No. 14/588,833, filed Jan. 2, 2015.

* cited by examiner

SYNCHRONOUS AND ASYNCHRONOUS DISCARD SCANS BASED ON THE TYPE OF CACHE MEMORY

BACKGROUND

1. Field

The disclosure relates to a method, system, and article of manufacture for synchronous and asynchronous discard scans based the type of cache memory.

2. Background

A storage controller may be coupled to one or more of a plurality of hosts. The storage controller may manage a plurality of storage devices, such as disk drives, tape drives, etc., that are coupled to the storage controller. The plurality of hosts may access data stored in the storage devices via the storage controller.

The storage controller may maintain a cache, where a cache is a type of storage that is capable of providing faster access to data in comparison to storage devices such as disk drives or tape drives. The storage space provided by the cache is smaller in size than the storage space provided by the disk drives or tape drives, where the storage provided by the disk drives or tape drives, and other devices, may be referred to as secondary storage. As a result, tracks may need to be staged (i.e., moved to the cache from secondary storage) or destaged (i.e., moved from the secondary storage to the cache) to prevent the cache from becoming full and to provide faster access to data. In many situations, to release space in the cache, tracks may be discarded from the cache.

SUMMARY OF THE PREFERRED EMBODIMENTS

Provided are a method, a system, a computer program in which a computational device maintains a first type of cache and a second type of cache. The computational device receives a command from the host to release space. The computational device synchronously discards tracks from the first type of cache, and asynchronously discards tracks from the second type of cache.

In certain embodiments, the first type of cache is smaller in size than the second type of cache.

In additional embodiments, the first type of cache is a dynamic random access memory (DRAM) cache and the second type of cache is a flash cache.

In certain embodiments, a determination is made as to whether discard scans from the first type of cache on an average take a time than is greater than a threshold amount of time. In response to determining that discard scans from the first type of cache on an average take a time that is greater than the threshold amount of time, discard scans for the first type of cache are set to execute asynchronously with the command from the host.

In further embodiments, in response to determining that discard scans from the first type of cache on a average take a time that is less than or equal to the threshold amount of time, the discard scans for the first type of cache are set to execute synchronously with the command from the host.

In certain embodiments, a determination is made as to whether a cache directory corresponding to the first type of cache is greater than a threshold amount of space. In response to determining that the cache directory corresponding to the first type of cache is greater than the threshold amount of space, discard scans for the first type of cache are set to execute asynchronously with the command from the host.

In further embodiments, in response to determining that the cache directory corresponding to the first type of cache is less than or equal to the threshold amount of space, the discard scans for the first type of cache are set to execute synchronously with the command from the host.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Storage space may be released in a storage controller for a plurality of reasons. In certain embodiments, storage space may be released when a volume is deleted. In other embodiments, storage space may be released, in response to receiving a host command to reclaim storage space.

In certain embodiments, both DRAM cache and flash cache are maintained in the storage controller to provide faster access to data to the host. For space to be released, tracks in DRAM cache and flash cache may have to be discarded. DRAM cache is much smaller in size in comparison to flash cache and as a result discard from DRAM cache can be done synchronous to the release space command, i.e., the release space command waits while the discards from DRAM cache are being performed.

However, a different mechanism is applied for discards from flash cache. A discard scan needs to scan the cache directory and discard tracks corresponding to the space being released. There is a major difference in the size of the cache directory for DRAM cache and flash cache. Cache directory for flash cache is considerably larger and it may a long time to scan the flash cache directory to find flash cache tracks to discard. As a result, discarding tracks from flash cache may take much longer and hence it cannot be done synchronously with operations received from the host, as it may lead to timeouts for the operations. In certain embodiments flash cache discard scans are performed asynchronously with operations received from the host.

Certain embodiments provide a mechanism for performing synchronous or asynchronous discard scans based on cache size. In certain embodiments, discard scans from a flash cache are performed asynchronously, and discard scans from a DRAM cache are performed synchronously.

Exemplary Embodiments

Figure 1:
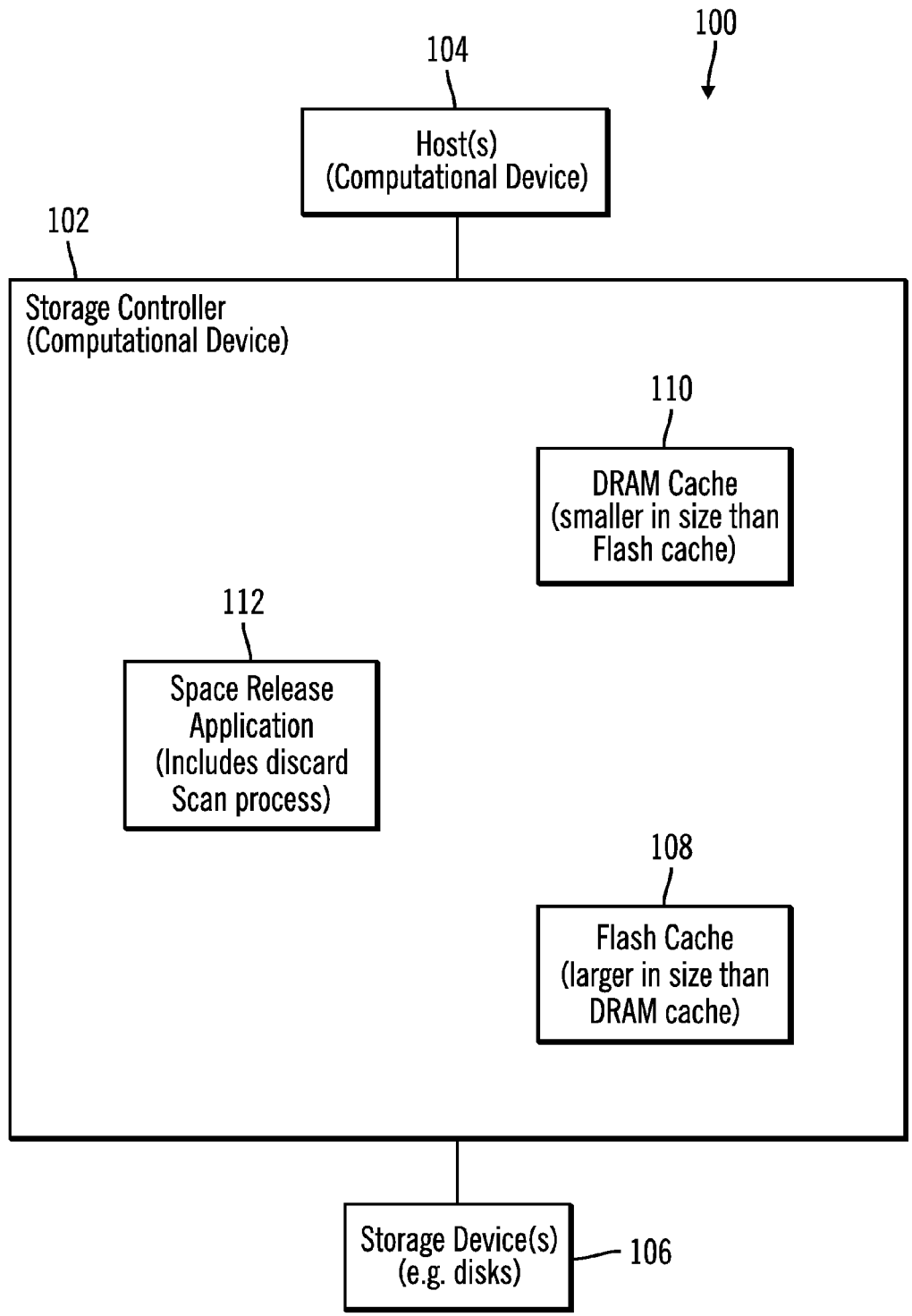
FIG. 1 illustrates a block diagram of a computing environment that includes a storage controller coupled to a host, in accordance with certain embodiments.

FIG. 1 illustrates a block diagram of a computing environment 100 that includes a storage controller 102 coupled to one or more hosts 104, in accordance with certain embodiments. The storage controller manages storage for the host 104, by controlling one or more storage devices 106.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a server, etc. The storage devices 106 may comprise any suitable storage device including those presently known in the art, such as magnetic disks, optical disks, tapes, etc. In certain embodiments, the host 104, the storage controller 102, and the storage devices 106 may be coupled via a network, such as the Internet, an intranet, a storage area network, a local area network, etc.

The storage controller 102 may include a flash cache 108 and a DRAM cache 110. The flash cache 108 may be comprised of a plurality of solid state disks. The DRAM cache 110 may be comprised of a plurality of DRAM elements, also referred to as DRAM memory. Solid state disks are usually much cheaper per unit of storage in comparison to DRAM memory, and in certain embodiments, the flash cache 108 may be considerably larger in size in comparison to the DRAM cache 110. The term larger in size refers to the size of memory capacity, and the memory capacity provided by the flash cache 108 is considerably larger than the memory capacity provided by the DRAM cache 110. It should be noted that both the flash cache 108 and the DRAM cache 110 together provide caching services to cache data and provide faster access to data stored in the storage devices 106.

The storage controller 102 also includes a space release application 112 that executes in the storage controller 102. The space release application 112 may be implemented in software, firmware, hardware, or any combination thereof. The space release application 112 when executed may perform discard scan processes that are used to determine tracks to be discarded from the cache.

Therefore, FIG. 1 illustrates certain embodiments in which a storage controller 102 maintains two different type of cache: a flash cache 108 and a DRAM cache 110. The flash cache 108 is considerably larger in size in comparison to the DRAM cache 110.

Figure 2:
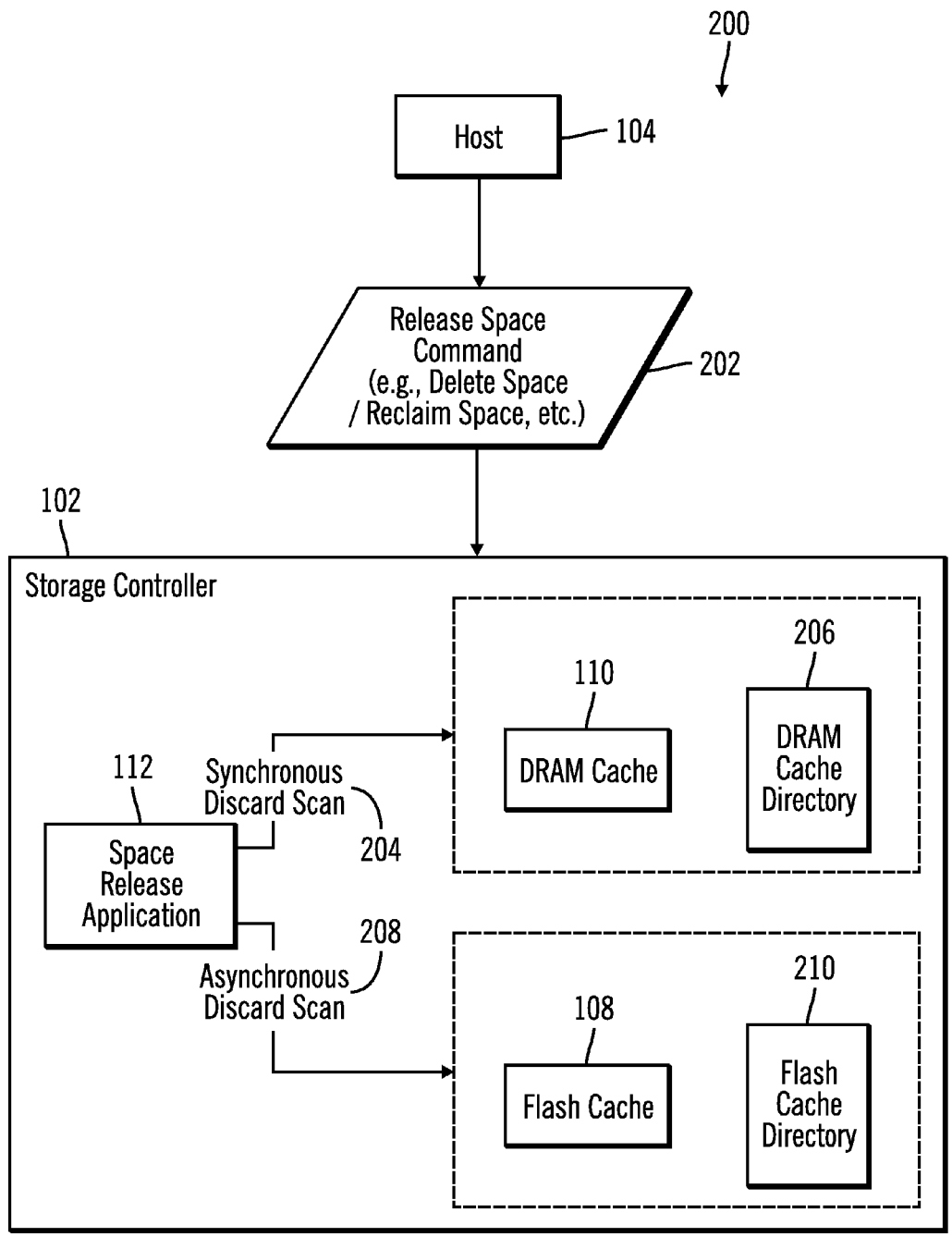
FIG. 2 illustrates a block diagram that shows asynchronous and synchronous discard scans being performed in a storage controller, in accordance with certain embodiments.

FIG. 2 illustrates a block diagram 200 that shows asynchronous and synchronous discard scans being performed in the storage controller 102, in accordance with certain embodiments.

In certain embodiments, the host 104 may send the storage controller 102 a release space command 202, where the release space command 202 may request that space is to be released by the storage controller. The release of space may occur through various mechanisms, such as deletion of space, reclamation of space, etc.

The storage controller 102 receives the release space command 202, and in response the space release application 112 may start a synchronous discard scan process 204 to scan a DRAM cache directory 206 corresponding to the DRAM cache 110, to determine tracks that are to be discarded from the DRAM cache 110. The synchronicity of the synchronous discard scan process 204 is with respect to the release space command 202, i.e., the release space command 202 waits for completion while the synchronous discard scan process 204 is being executed.

In response to receiving, the release space command 202, the space release application 112 may also start an asynchronous discard scan process 208 to scan flash cache directory 210 corresponding to the flash cache 108, to determine tracks that are to be discarded from the flash cache 108. The asynchronicity of the asynchronous discard scan process 208 is with respect to the release space command 202, i.e., the release space command 202 does not wait for completion while the asynchronous discard scan process 208 is being executed.

The synchronous discard scan process 204 and the asynchronous discard scan process 208 are used to discard tracks from the DRAM cache 110 and the flash cache 108 respectively. Tracks are discarded synchronously from the DRAM 110 because the memory size and the number of tracks in the DRAM cache 110 are of a sufficiently small magnitude, such that space cap be released quickly from the DRAM cache 110, prior to any failure via timeouts of the release space command 202.

Tracks are discarded asynchronously from the flash cache 108 because the memory size and the number of tracks in the flash cache 108 are of a sufficiently large magnitude, such that the release space command 202 may fail via timeouts, etc., should the release space command 202 wait while tracks are being discarded from the flash cache 108.

Figure 3:
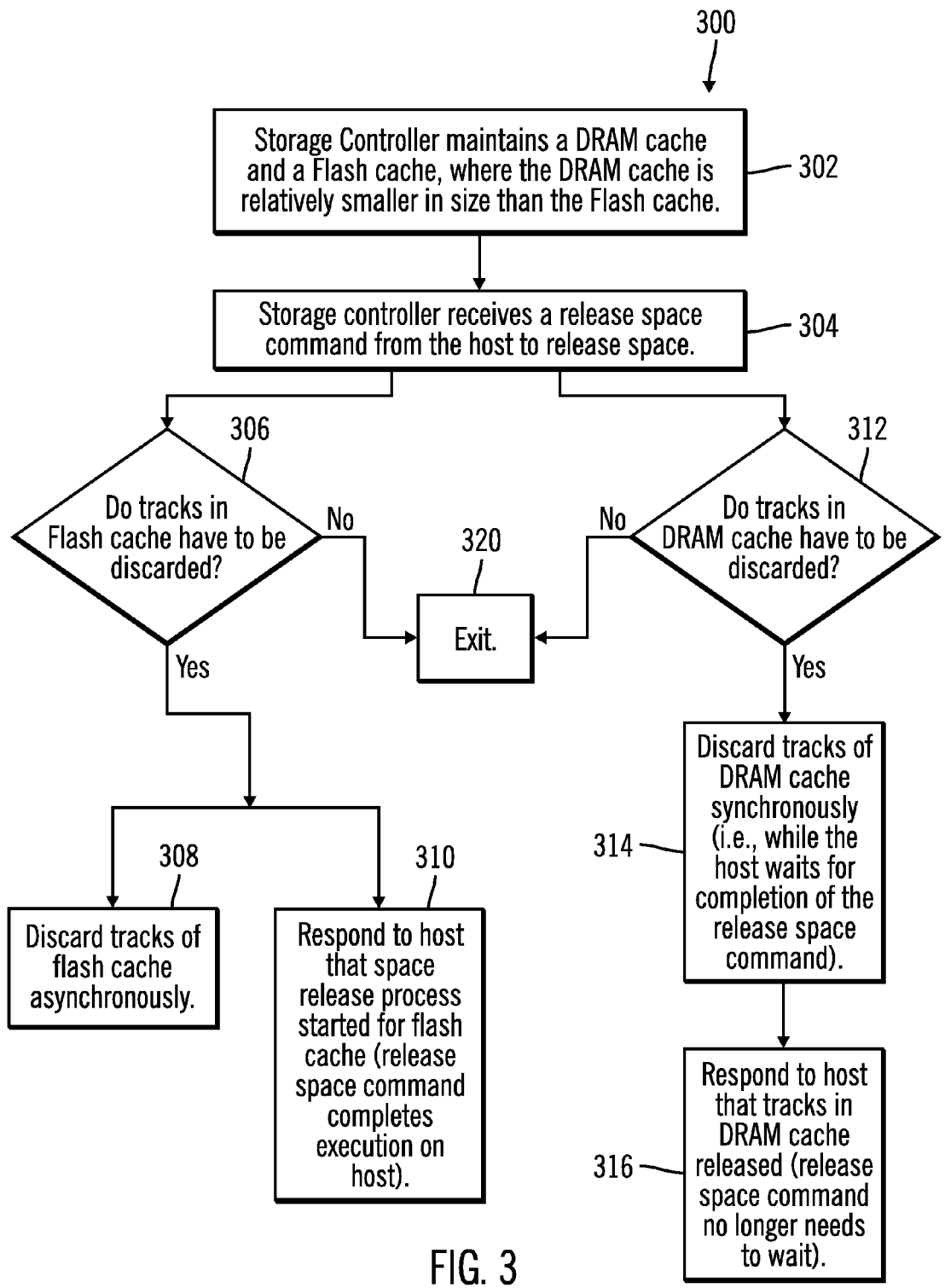
FIG. 3 illustrates first flowchart that shows synchronous discard of tracks in dynamic random access memory (DRAM) cache, and asynchronous discard of tracks in flash cache, in accordance with certain embodiments.

FIG. 3 illustrates first flowchart 300 that shows synchronous discard of tracks in dynamic random access memory (DRAM) cache 110, and asynchronous discard of tracks in flash cache 108, in accordance with certain embodiments. The operations shown in FIG. 3 may be performed by the space release application 112 that executes in the storage controller 102.

Control starts at block 302, in which the storage controller 102 maintains a DRAM cache 110 and a Flash cache 108, where DRAM cache 110 is much smaller in size in comparison to the flash cache 108. Control proceeds to block 304, in which the storage controller 102 receives a release space command 202 from the host 104 to release space.

From block 304 control proceeds in parallel to blocks 306 and 312. At block 306, the space release application 112 that executes in the storage controller 102 determines whether tracks in the flash cache 108 have to be discarded. If so, control proceeds to blocks 308 and 310 in parallel, and the space release application 112 discards (at block 308) tracks of the flash cache 110 asynchronously, and in parallel (i.e., prior to completion of the asynchronous discards) responds (at block 310) to the host 104 that the space release process has started for the flash cache 108, and the release space command 202 completes execution. It may be noted that the release space command 202 completes execution while the asynchronous discard scans 208 are still going on.

At block 312, the space release application 112 determines whether tracks in the DRAM cache 110 have to be discarded. Tracks of the of DRAM cache 110 are discarded at block 314) synchronously (i.e., while the host 104 waits for completion of the release space command 202). On completion of the synchronous discards, the space release application 112 responds (at block 316) to the host 104 that tracks in the DRAM cache 206 have been released and then the release space command 202 completes execution.

From block 306, the process may exit (at block 320) if no tracks have to be discarded from the flash cache 110. Also, from block 312 the process may exit (at block 320) if no tracks have to be discarded from the DRAM cache 108.

Therefore, FIG. 3 illustrates certain embodiments in which asynchronous discards are performed from the flash cache 108, and synchronous discards are performed from the DRAM cache 110.

Figure 4:
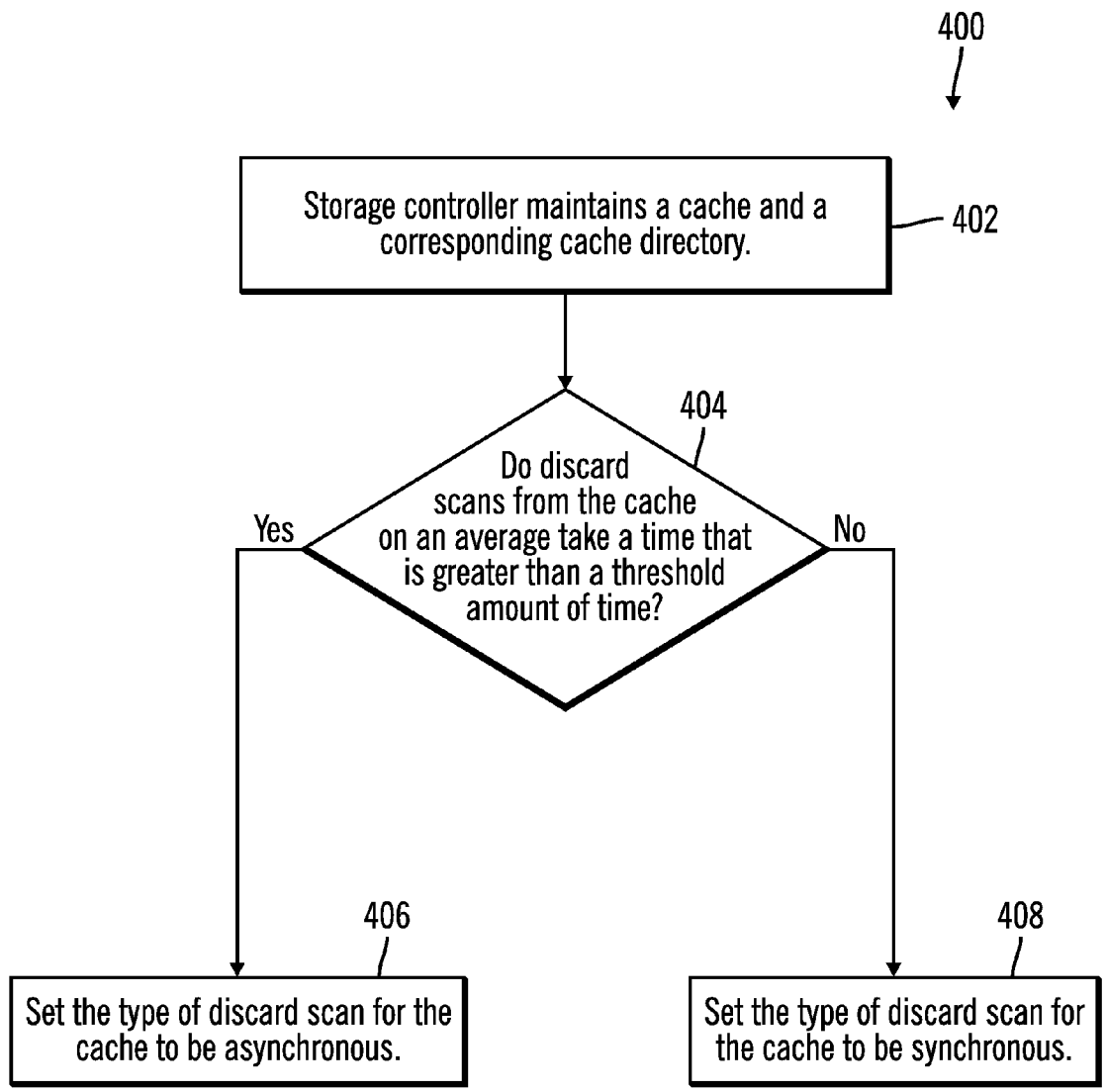
FIG. 4 illustrates a second flowchart that shows how the type of discard scan is set based on the time taken to perform discard scans, in accordance with certain embodiments.

FIG. 4 illustrates a second flowchart 400 that shows how the type of discard scan is set, based on the time taken to perform discard scans, in accordance with certain embodiments. The operations shown in FIG. 4 may be performed by the space release application 112 that executes in the storage controller 102.

Control starts at block 402, in which a storage controller 102 maintains a cache (e.g. cache 108 or 110) and a corresponding cache directory (e.g., cache directory 206 or 210). Control proceeds to block 404 in which the space release application 112 determines whether discard scans from the cache on an average take a time that is greater than a threshold amount of time (the threshold amount of time may be provided a priori by an administrator or automated program or may be determined via analysis of historical statistics on performance time). If so, then the type of discard scan for the cache is set (at block 406) to be asynchronous. If not, then the type of discard scan for the cache is set (at block 408) to be synchronous.

Therefore, FIG. 4 illustrates certain embodiments in which a determination is made as to whether discard scans from a first type of cache on an average take a time than is greater than a threshold amount of time. In response to determining that discard scans from the first type of cache on an average take a time that is greater than the threshold amount of time, discard scans for the first type of cache are set to execute asynchronously with the command from the host. In further embodiments, in response to determining that discard scans from the first type of cache on a average take a time that is less than or equal to the threshold amount of time, the discard scans for the first type of cache are set to execute synchronously with the command from the host.

Figure 5:
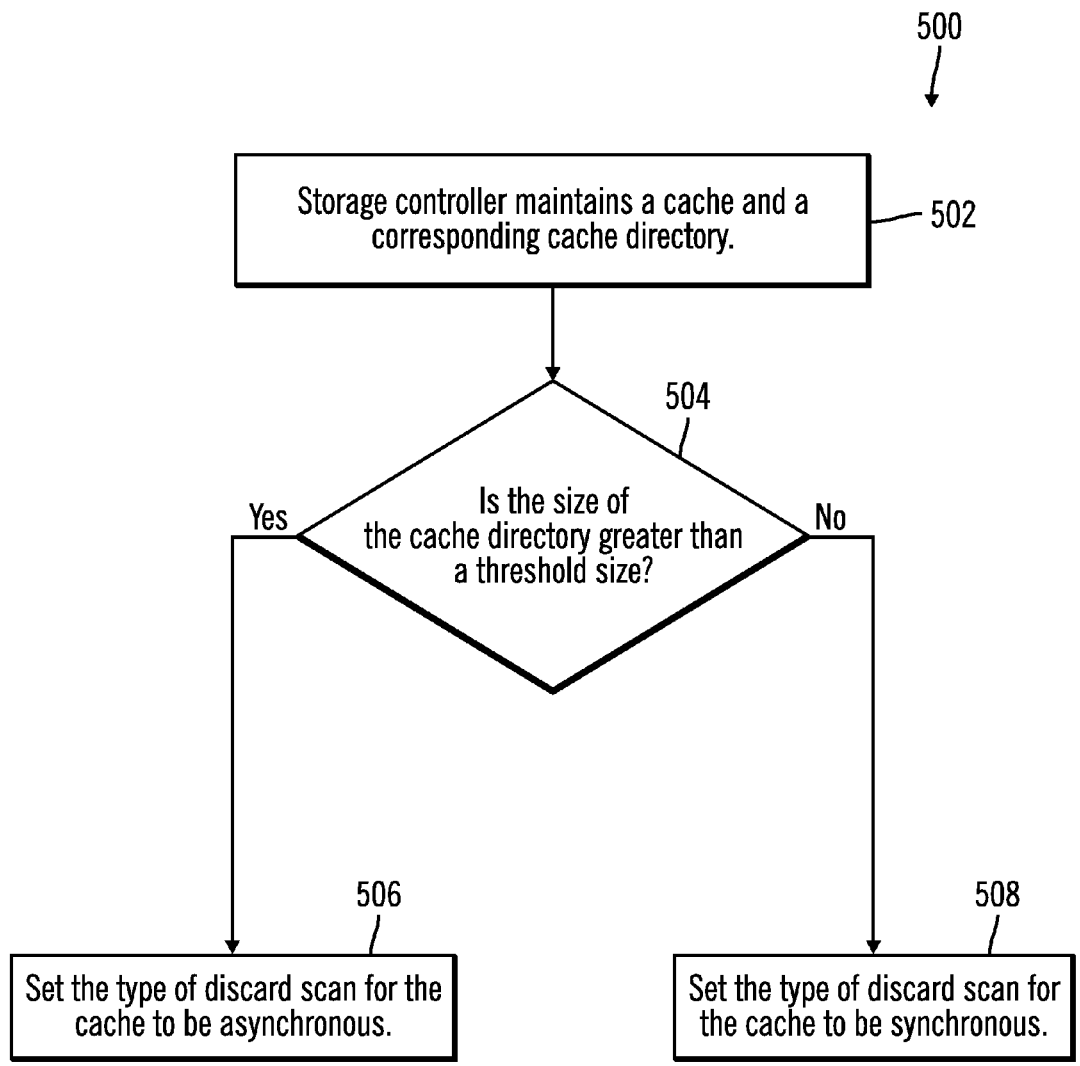
FIG. 5 illustrates a third flowchart that shows how the type of discard scan is set based on the size of the cache directory, in accordance with certain embodiments.

FIG. 5 illustrates a third flowchart 500 that shows how the type of discard scan is set based on the size of the cache directory associated with a cache, in accordance with certain embodiments. The operations shown in FIG. 5 may be performed by the space release application 112 that executes in the storage controller 101

Control starts at block 502, in which a storage controller 102 maintains a cache (e.g. cache 108 or 110) and a corresponding cache directory (e.g., cache directory 206 or 210). Control proceeds to block 504 in which the space release application 112 determines whether the size of the cache directory is greater than a threshold size (the threshold size may be provided a priori by an administrator or an automated program or may be determined via performance analysis). If so, then the type of discard scan for the cache is set (at block 506) to be asynchronous. If not, then the type of discard scan for the cache is set (at block 508) to be synchronous.

Therefore, FIG. 5 illustrates certain embodiments in which a determination is made as to whether a cache directory corresponding to the first type of cache is greater than a threshold amount of space. In response to determining that the cache directory corresponding to the first type of cache is greater than the threshold amount of space, discard scans for the first type of cache are set to execute asynchronously with the command from the host. In response to determining that the cache directory corresponding to the first type of cache is less than or equal to the threshold amount of space, the discard scans for the first type of cache are set to execute synchronously with the command from the host.

Figure 6:
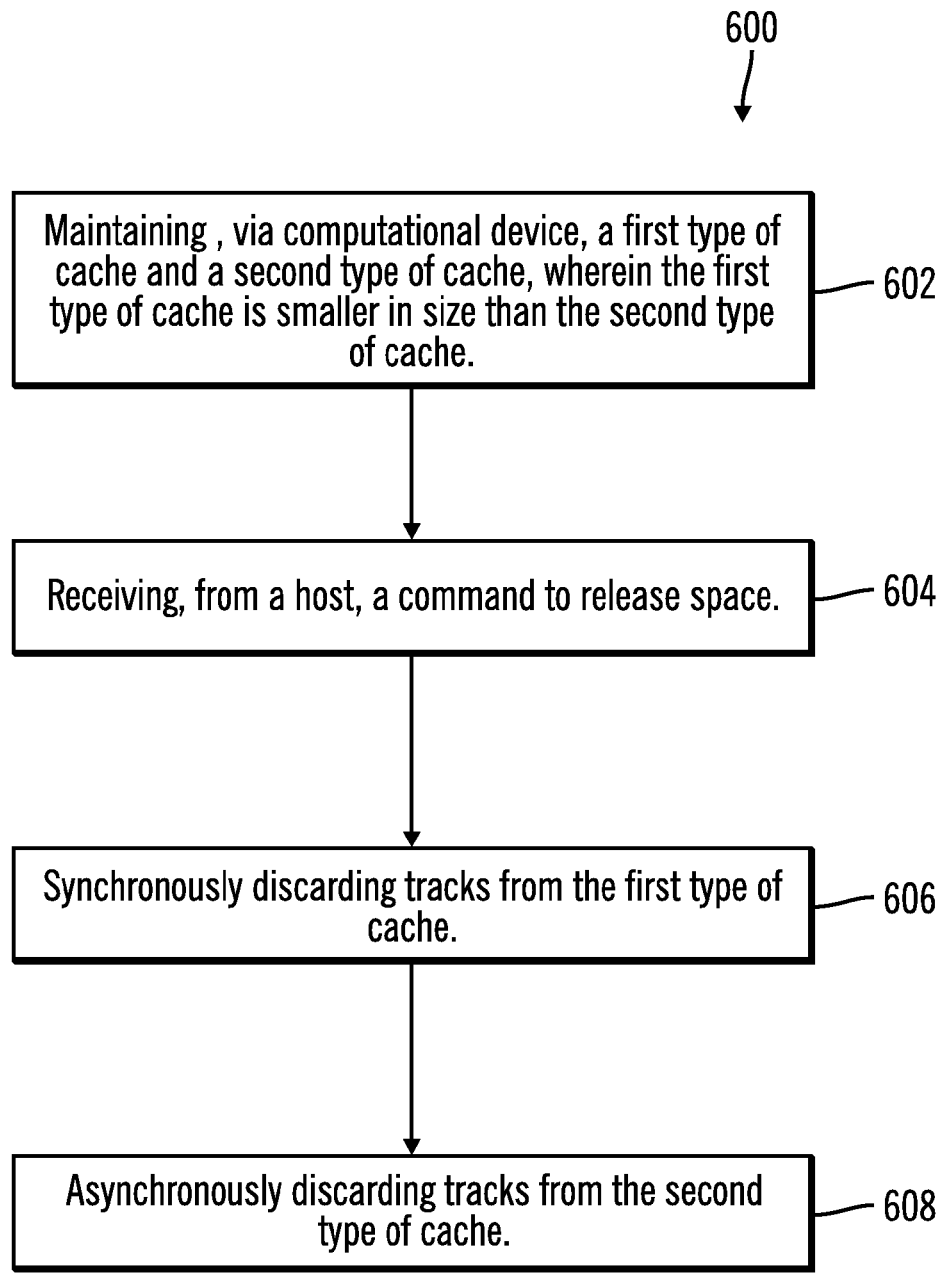
FIG. 6 illustrates a fourth flowchart that shows operations for performing synchronous and asynchronous discard of tracks, in accordance with certain embodiments.

FIG. 6 illustrates a fourth flowchart 600 that shows operations for performing synchronous and asynchronous discard of tracks, in accordance with certain embodiments. The operations shown in FIG. 6 may be performed by the space release application 112 that executes in the computational device 102.

Control starts at block 602 in which the computational device 102 computational device maintains a first type of cache (e.g. DRAM cache 110) and a second type of cache (e.g., flash cache 108). In certain embodiments, the memory size of the first type of cache is much smaller than the memory size of the second type of cache. In certain embodiments, the first type of cache is a dynamic random access memory (DRAM) cache and the second type of cache is a flash cache.

The computational device receives (at block 604) a command 202 from the host 104 to release space. The computational device 102 synchronously discards (at block 606) tracks from the first type of cache, and asynchronously discards (at block 608) tracks from the second type of cache.

Therefore, FIGS. 1-6 illustrate certain embodiments, in which based on the characteristics of the elements that comprise a cache, asynchronous or synchronous discard scans are used for releasing space from the cache.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system" Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
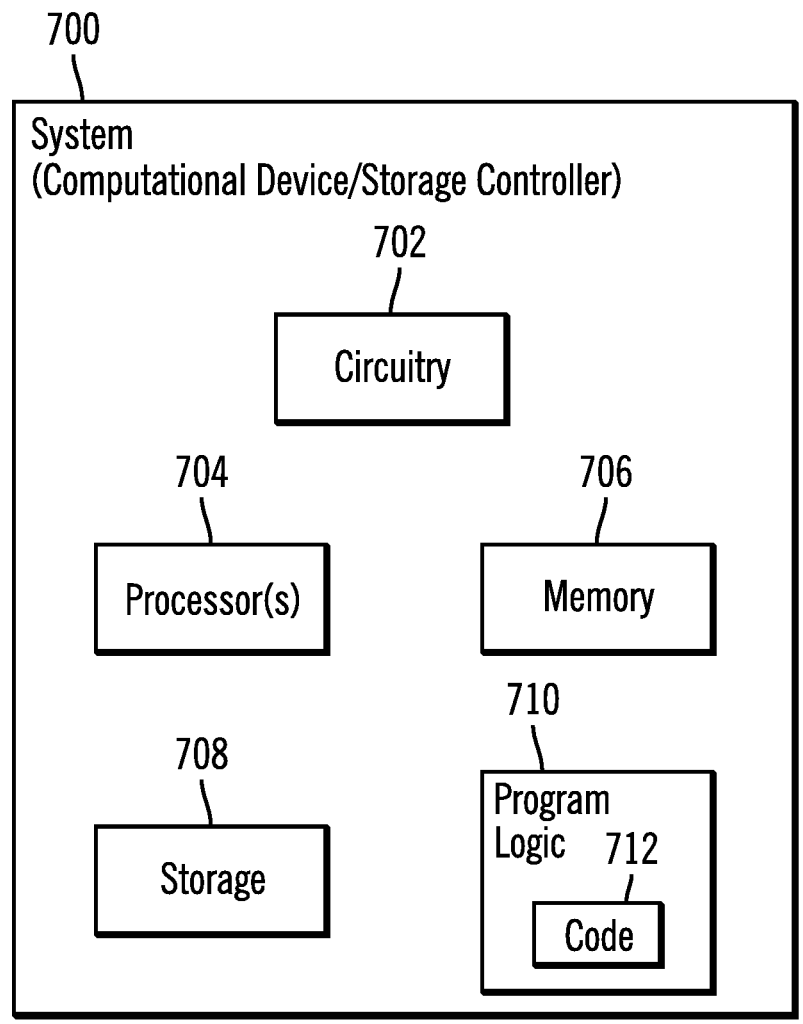
FIG. 7 illustrates a block diagram of a computational system that shows certain elements that may be included in at least the computational device of FIG. 1, in accordance with certain embodiments.

FIG. 7 illustrates a block diagram that shows certain elements that may be included in the computational device 102 in accordance with certain embodiments. The system 700 may comprise the computational device 102, and may include a circuitry 702 that may in certain embodiments include at least a processor 704. The system 700 may also include a memory 706 (e.g., a volatile memory device), and storage 708. The storage 708 may include anon-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices Which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system coupled to a host, wherein the system is coupled to a dynamic random access memory (DRAM) cache and a flash cache, wherein the DRAM cache is smaller in size than the flash cache, the system comprising:
   a memory; and
      a processor coupled to the memory, wherein the processor performs operations, the operations comprising:
      receiving, from the host, a command to release space;
      determining whether to discard tracks from the DRAM cache or the flash cache based on comparing a size of a corresponding cache directory with a threshold size;
      in response to determining that the tracks in the DRAM cache have to be discarded to release the space requested by the command, synchronously discarding tracks via a synchronous discard scan process from the DRAM cache, wherein the command to release the space waits for completion while the synchronous discard scan process is being execute, and wherein in response to completion of execution of the synchronous discard scan process, responding to the host that the tracks in the DRAM cache have been released; and
      in response to determining that tracks in flash cache have to be discarded to release the space requested by the command, asynchronously discarding tracks via an asynchronous discard scan process from the flash cache, wherein the command to release the space does not wait for completion while the asynchronous discard scan process is being executed, wherein prior to completion of execution of the asynchronous discard scan process, responding to the host that space release operation has been started for the flash cache, and wherein the command to release the space fails via timeout if the command to release the space waits for the asynchronous discard scan process to complete.

2. The system of claim 1, the operations further comprising:
   in response to determining that tracks in DRAM cache do not have to be discarded to release the space, exiting without discarding tracks from the DRAM cache; and
   in response to determining that tracks in flash cache do not have to be discarded to release the space, exiting without discarding tracks from the flash cache.

3. A computer program product, the computer program product comprising
   a non-transitory computer readable storage medium having computer readable program code embodied therewith, the computer readable program code configured to perform operations on a computational device is coupled to a dynamic random access memory (DRAM) cache and a flash cache, wherein the DRAM cache is smaller in size than the flash cache, the operations comprising:
   receiving, from a host, a command to release space;
   determining whether to discard tracks from the DRAM cache or the flash cache based on comparing a size of a corresponding cache directory with a threshold size;
   in response to determining that the tracks in the DRAM cache have to be discarded to release the space requested by the command, synchronously discarding tracks via a synchronous discard scan process from the DRAM cache, wherein the command to release the space waits for completion while the synchronous discard scan process is being executed, and wherein in response to completion of execution of the synchronous discard scan process, responding to the host that the tracks in the DRAM cache have been released; and
   in response to determining that tracks in flash cache have to be discarded to release the space requested by the command, asynchronously discarding tracks via an asynchronous discard scan process from the flash cache, wherein the command to release the space does not wait for completion while the asynchronous discard scan process is being executed, wherein prior to completion of execution of the asynchronous discard scan process, responding to the host that space release operation has been started for the flash cache, and wherein the command to release the space fails via timeout if the command to release the space waits for the asynchronous discard scan process to complete.

4. The computer program product of claim 3, the operations further comprising:
   in response to determining that tracks in DRAM cache do not have to be discarded to release the space, exiting without discarding tracks from the DRAM cache; and
   in response to determining that tracks in flash cache do not have to be discarded to release the space, exiting without discarding tracks from the flash cache.

* * * * *